Figure 1:
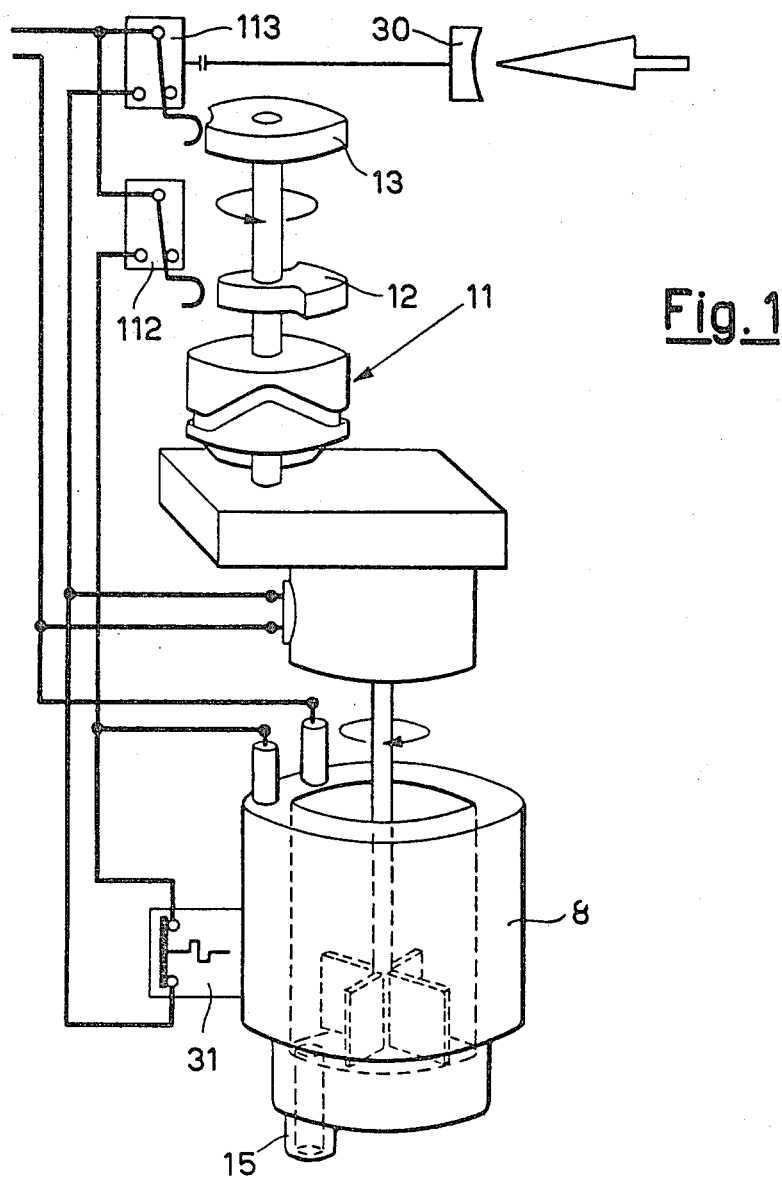

United States Patent [19]

Di Girolamo

[11] 4,357,861
[45] Nov. 9, 1982

[54] APPARATUS FOR BREWING A HOT BEVERAGE MADE UP OF A SOLUTION OF A POWDERED SUBSTANCE IN A LIQUID

[76] Inventor: Silvestro Di Girolamo, Via Barzoni, 2, Milan, Italy

[21] Appl. No.: 820,819

[22] Filed: Aug. 1, 1977

[30] Foreign Application Priority Data

Aug. 6, 1976 [IT] Italy ................................ 26122 A/76

[51] Int. Cl.³ .............................................. A23F 5/00
[52] U.S. Cl. .................... 99/323.3; 99/289 R; 222/129.1; 222/129.4; 366/146; 366/177
[58] Field of Search ................ 99/275, 279, 280, 287, 99/289, 281, 298, 300, 304, 316, 348, 323.3; 366/162, 177, 178, 179, 181, 182, 160, 146, 150–152; 222/129.1, 129.4

[56] References Cited

U.S. PATENT DOCUMENTS

| 2,827,845 | 3/1958 | Richeson | 99/287 |
| 3,176,968 | 4/1965 | Appleton | 366/146 |
| 3,382,897 | 5/1968 | Skiera et al. | 222/129.1 |
| 3,568,887 | 3/1971 | Jacobs | 222/129.4 |

Primary Examiner—Philip R. Coe
Assistant Examiner—Timothy F. Simone
Attorney, Agent, or Firm—Cushman, Darby and Cushman

[57] ABSTRACT

A hot-beverage-brewing machine is disclosed in which the improvements consist in having the heating means directly applied to a cuplike compartment in which a single dosage unit is individually brewed and in providing a rotary blender dipping in the cuplike compartment to improve the heat exchange between the compartment wall and the liquid. Timing means are provided for having the water and soluble powder feeds in the appropriate sequence consistently with the other operations which are required for brewing the beverages.

8 Claims, 3 Drawing Figures

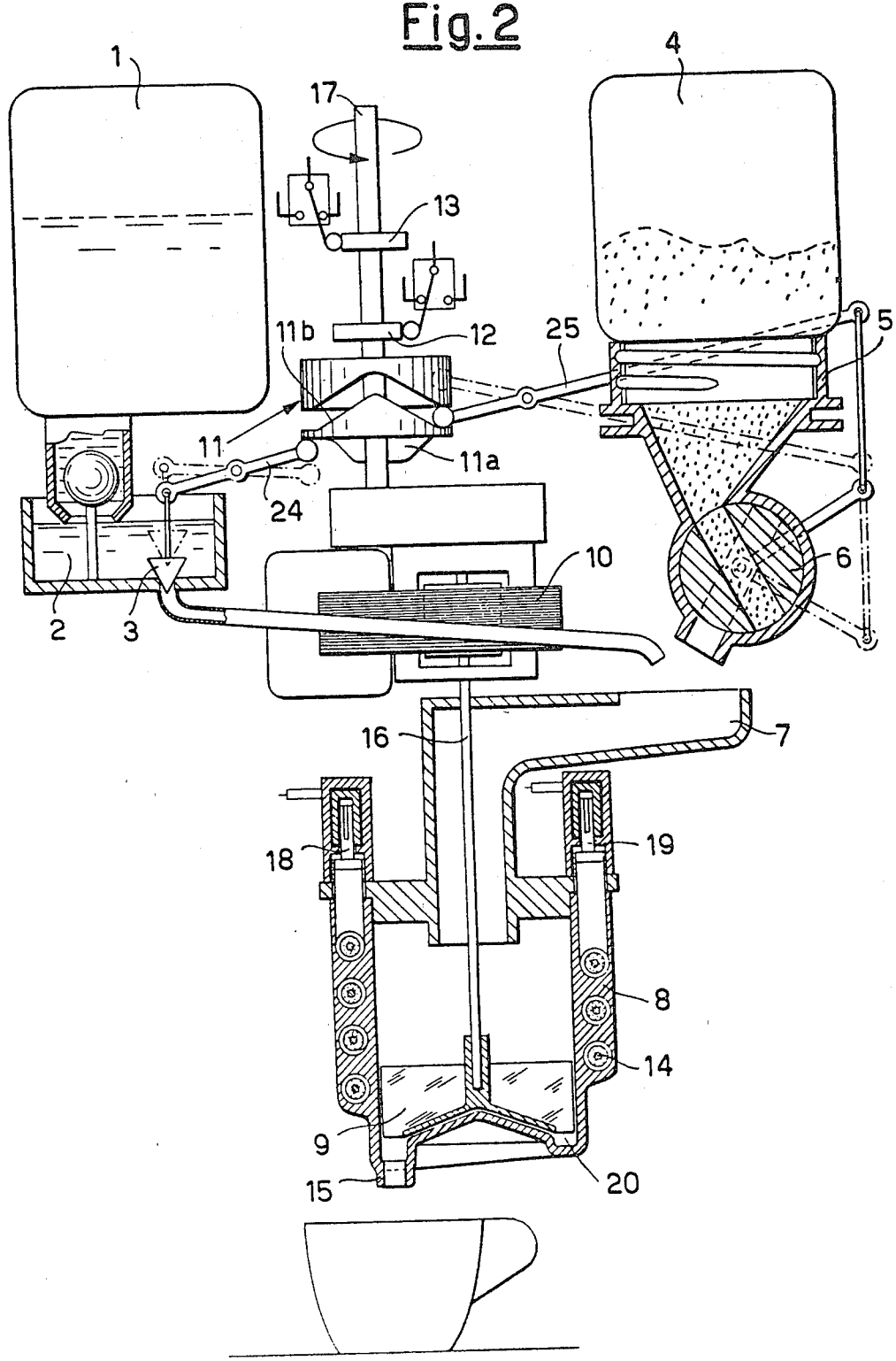

APPARATUS FOR BREWING A HOT BEVERAGE MADE UP OF A SOLUTION OF A POWDERED SUBSTANCE IN A LIQUID

This invention relates to a machine for brewing beverages by admixing products which are soluble in a liquid, especially water. More particularly, the invention relates to an apparatus of the kind referred to above but automatically operated, that is, those machines which sequentially carry out the metering of the liquid and the soluble product, the stirring of these and the discharge of the solution which is the expected beverage.

A few problems arise, which are not readily soluble, when hot beverages are to be prepared. As a matter of fact, in this case and in the conventional machines, a boiler must be provided for, at the outset, in which a quantity of hot liquid must be held which corresponds to a number of servings. Apart from the difficulty of manufacture and the running costs and upkeep of such a boiler, which must obviously be thermostatically controlled, it is necessary, furthermore, to provide to keep at a constant temperature those component parts of the machine which are intended to contact the liquid during the beverage brewing operation: these component parts have a considerable thermal inertia. As a matter of fact, if no provisions are made in order to maintain these component parts at a temperature near that of the beverages to be brewed, a heat exchange therebetween would occur and such an exchange could be, as it is obvious, a function of the frequency of the beverage helpings.

Summing up, without such a temperature control of the machine, the hot beverages which are prepared by a machine which is inoperative since a rather long time and which is thus at room temperature, would be dispensed after having suffered from a considerable removal of heat therefrom, that is to say, comparatively cooled.

An object of the invention is to overcome such an intricacy of construction as is present in the conventional dispensing machines so as to permit that a substantial constructional simplification may be achieved.

It has been ascertained, in fact, that a vigorous stirring of the solid-liquid admixture, which takes place in a narrow chamber which contains a dosage unit, necessarily causes the displacement at a high speed of the solution being brewed within a narrow chamber: it has been seen that such a high speed of the liquid permits so intensive a heat exchange with the chamber walls that heating of the beverages takes place within the time which is required in practice for completing an adequate dissolution.

Then, according to the invention, it is suggested to provide a machine for brewing a whipped hot beverage consisting of a powdered substance and a liquid, characterized in that it comprises, in combination, a blender which is driven to rotation within a treatment chamber having walls susceptible of being heated by heating means, first and second metering means adapted to feed such chamber with a dosage unit of liquid and a dosage unit of powdered substance, respectively, motive means being further provided, and control means adapted to command in the correct operational sequence said blender, said heating means and said metering means, the beverage being dispensed by gravity through an opening formed through the bottom wall of said chamber.

Figure 3:
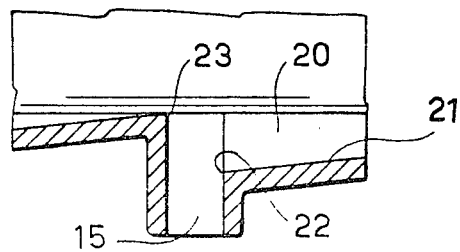

Structural and functional features of the invention and its advantages over the prior art become still more conspicuous from a scrutiny of the exemplary description which follows, aided by the accompanying drawings, wherein:

FIG. 1 is a diagrammatical perspective view showing the principal component part of the machine according to the invention, FIG. 2 is a side elevational view, partly in cross-section, of the same machine, and FIG. 3 is a close-up view of the beverage-treatment chamber.

The machine in question is structurally composed by a reducing motorized gear, 10, from which emerges, downwardly, a speedy arbor 16 which drives to rotation the vaned spider 9 of the blender, whereas, a slow arbor 17 emerges upward to drive control cams of the automatic devices of the machine.

A treatment barrel 8, having an electric resistor 14 embedded in its wall, is fitted with a blending device, such as a whipping spider 9, which has the capability of displacing liquid in the barrel 8 into contact with the side wall of the chamber. Said chamber has at its top two jacks, 18 and 19, for conveying electricity and which enter specially provided sockets which are also adapted to latch the chamber in position: the chamber, therefore, is removable that is it can be withdrawn from its seating.

Centrally of the chamber 8, a duct vertically protrudes, which comes from a feeding manifold 7 into which metering means pour the dosage unit of soluble powder and the dosage unit of water.

Water comes from a tank 1, the latter being, for example, an inverted bottle, the neck end of which is immersed in a constant-level tub 2. The constancy of the level, as is well known, is secured by the fact that the level of the tube 2 is immediately restored as soon as the waterline sweeps the bottleneck bead and allows air to enter into the bottle.

A valve 3 of the tub, actuated by its lever 24 connected to the cam 11a of a camblock 11, delivers a dosage unit of water, at the proper instant, to the manifold 7.

In the neck of the bottle 1 a ball is located, which is held aloft by a vertical shank: as the bottle is withdrawn to top it up with water, the ball falls and momentarily stoppers the bottle mouth.

The soluble powder is held in a box 4, which can be, for example, the container itself in which the product is sold as such on the market. The container is screwed to a ferrule 5, the latter being removable from the machine.

From the container 4, no matter how shaped, the soluble power falls into a metering unit having a movable slide, such as a conventional rotary-vane metering unit 6, the vane of which when oriented in a way fills the metering unit and, when oriented otherwise, dumps the powder into the manifold 7.

The position of the metering unit vane is determined by the lever 25: the latter is connected to the cam 11b of the camblock 11.

The machine is controlled by cams 12 and 13 ganged with the cam 11.

The cam 13 is active upon a switch 113 which can be manually actuated by the pushbutton 30 to close the switch: the cam holds the switch 113 closed for the major fraction of an entire revolution.

The cam 12 is active upon a switch 112 in the sense of closing it during an angular stroke which is a fraction of a whole revolution. The switch 113, as it is closed, energizes the motor 10, and, via the thermostatic switch 31, the resistor 14 is heated.

The switch 112 feeds the resistor by by-passing the switch 31. The cycle is started by quickly pressing the pushbutton 30: immediately thereafter the cam 13 enters action to keep closed the switch 113 so as to drive the motor to rotation. If the switch 31 is closed (the container is cold), the electric resistor 14 immediately starts heating and is properly timed by the cam 13.

The cams define the dosage of the soluble powder and the cold water which, falling into the manifold 7, are delivered to the treatment chamber 8.

In the barrel, the arbor 16 is quickly rotated with its spider 9. The soluble powder is dissolved in the water and this is quickly heated, so that the whipped hot beverage is ready in a few seconds. Water heating is extremely quick since the water, whirled against the walls of the chamber 8, tenders a wide surface of heat-exchange, if compared with its small volume.

The apparatus is automatically stopped and the beverage, no longer held by the whirling motion of the blender, is poured through the spout 15 and is aided in its motion by the tapered bottom of the cylindrical barrel 18.

In this connection it is to be noted that, to prevent undesirable drippings of beverage which has not been properly prepared, the spout 15 has, cooperating therewith, a helical raceway 20 (FIG. 2) which as wide as the diameter of the spout 15. The raceway 20 starts from the spout and is terminated in correspondence with it, but at a higher level. Thus, the liquid which has been whirled gradually rises along the ramp 21 and proceeds from the bottom point 22 to the top point 23. On account of the level gradient and the velocity of the liquid, the liquid stream goes astraddle of the spout 15 and this motion continues until the machine works.

As soon as the machine is stopped, the centrifugal force which supported the liquid against the barrel 8 is no longer active and the same is true of the thrust which, along the helical pathway, tended to raise the liquid. Consequently, all the liquid is led downwards and is channeled towards the discharge port opening into the spout 15: a cup is placed beneath the spout.

If the cycle is started when the barrel is hot (switch 31 open) because immediately before a beverage has been served, the resistor 14 is energized only for the short time during which the cam 12 acts upon 112.

As a general rule, the resistor and the cams are so sized that, at every cycle, the feed controlled by the cams 12 corresponds to the heat withdrawn by the beverage heating (in addition to the dispersion of heat which is to be taken into account), whereas the feed controlled by the cam 13 corresponds to said heat plus the heat due to the thermal inertia of the machine.

The thermostatic switch is calibrated on an intermediate value of the temperature which is properly selected and does not necessitate a great accuracy of calibration.

As outlined above, are removable for filling both the water bottle 1 and the soluble powder cam 4 placed above the removable metering unit.

The treatment chamber 8 in which the blender 9 is situated, is removable for cleaning and upkeep reasons, even though the blender is left where it stands.

The cam, which control the automatic devices, can be adjusted by the user himself: he has, thus, the possibility of varying the time of opening of the water valve, so as to vary the water dosage consistently with the powder dosage and to change the dosage units consistently with the quality of the soluble powder used. The cams 12 and 13 intended to vary the duration of energizing of the resistor 14 are thus in a position to vary the beverage temperature accordingly.

I claim:

1. A machine for brewing a hot whipped beverage formed of a solution of a powdered substance in a liquid, said machine comprising: a chamber having a side wall and a bottom wall; first and second metering means associated with said chamber operable upon activation to dispense predetermined quantities of powdered substance and liquid into said chamber; a blending device disposed in the chamber and motor means for rotating said device, the relationship between said blending device and the chamber side wall being such that upon operation of said device the liquid and powdered substance dispensed into said chamber is whirled and displaced against the chamber side wall and is supported thereby centrifugal force; heating means associated with said chamber side wall for rapidly heating the dispensed liquid as the same is whirled against said side wall; means defining a discharge port in said bottom wall for discharging whipped heated beverage by gravity when said blending device stops rotating; and control means for controlling said motordriven blending device, said first and second metering means and said heating means.

2. A machine as in claim 1 wherein said control means includes a plurality of cams and wherein said motor means includes a speed reducer, a high speed output shaft and a low speed output shaft, said high speed shaft driving said blending device, and said low speed shaft driving said plurality of cams.

3. A machine as in claim 1 wherein said control means includes a thermostat for sensing the temperature of a wall of said chamber and two driven cams which time the energization of said heating means through an electrical circuit which includes said thermostat.

4. A machine as in claim 1 including a feed manifold for receiving powdered substance and liquid from said first and second metering means and for passing the received substance and liquid to said chamber.

5. A machine as in claim 1 wherein the liquidmetering means includes a tank which discharges into a constant-level tub on the bottom of which a control valve is provided the opening of which is timed by said control means.

6. A machine as in claim 1 wherein the powdermetering means includes a movable slide placed beneath the discharge opening of a powder container, said slide being controlled by said control means.

7. A machine as in claim 1 wherein said blending device is a vaned spider.

8. A machine as in claim 1 wherein said chamber is cylindrical and wherein said discharge port is located at the end of a helical annular channel formed on the bottom wall of said chamber.

* * * * *